(12) United States Patent
Kush et al.

(10) Patent No.: US 12,241,389 B1
(45) Date of Patent: Mar. 4, 2025

(54) RADIAL TURBINE ASSEMBLY WITH CERAMIC MATRIX COMPOSITE AIRFOILS HAVING DOVETAIL RETENTION

(71) Applicant: Rolls-Royce North American Technologies Inc., Indianapolis, IN (US)

(72) Inventors: Matthew T. Kush, Indianapolis, IN (US); Michael D. Wood, Indianapolis, IN (US); Timothy P. Fuesting, Indianapolis, IN (US); Douglas D. Dierksmeier, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/481,744

(22) Filed: Oct. 5, 2023

(51) Int. Cl.
*F01D 5/32* (2006.01)
*F01D 5/28* (2006.01)
*F01D 5/30* (2006.01)

(52) U.S. Cl.
CPC .......... *F01D 5/326* (2013.01); *F01D 5/284* (2013.01); *F01D 5/3007* (2013.01); *F01D 5/32* (2013.01); *F01D 5/323* (2013.01); *F05D 2230/60* (2013.01); *F05D 2240/30* (2013.01); *F05D 2260/30* (2013.01)

(58) Field of Classification Search
CPC . F01D 5/04; F01D 5/043; F01D 5/045; F01D 5/048; F01D 5/32; F01D 5/3007; F01D 5/3084
See application file for complete search history.

(56) References Cited

U.S. PATENT DOCUMENTS

| 3,305,166 | A | * | 2/1967 | Castle | F04D 29/285 |
| | | | | | 415/198.1 |
| 10,641,111 | B2 | | 5/2020 | Sippel | |
| 10,655,479 | B2 | | 5/2020 | Sippel | |
| 10,787,916 | B2 | | 9/2020 | Shi | |
| 10,934,863 | B2 | | 3/2021 | Morrison | |
| 11,131,203 | B2 | | 9/2021 | Sippel | |
| 11,268,389 | B2 | | 3/2022 | Freeman | |
| 2010/0150725 | A1 | * | 6/2010 | Krautheim | F01D 5/326 |
| | | | | | 416/204 R |
| 2017/0138206 | A1 | * | 5/2017 | Smoke | F01D 5/048 |
| 2018/0128109 | A1 | * | 5/2018 | Humes | F01D 5/048 |
| 2018/0355736 | A1 | * | 12/2018 | Engel | F01D 5/3053 |
| 2019/0323354 | A1 | * | 10/2019 | Plante | F01D 5/045 |
| 2020/0340364 | A1 | | 10/2020 | Starr | |
| 2022/0381149 | A1 | * | 12/2022 | Picard | F01D 5/02 |

FOREIGN PATENT DOCUMENTS

WO   WO-2013087496 A1 * 6/2013 ............ F01D 5/025

* cited by examiner

*Primary Examiner* — David E Sosnowski
*Assistant Examiner* — Arthur Paul Golik
(74) *Attorney, Agent, or Firm* — Barnes & Thornburg LLP

(57) ABSTRACT

A radial turbine rotor incorporating ceramic matrix composite turbine blades is disclosed. The radial turbine rotor can include a dovetail shape retention features for coupling the ceramic matrix composite turbine blades to a central hub.

19 Claims, 3 Drawing Sheets

RADIAL TURBINE ASSEMBLY WITH CERAMIC MATRIX COMPOSITE AIRFOILS HAVING DOVETAIL RETENTION

FIELD OF THE DISCLOSURE

The present disclosure relates generally to radial turbines, and more specifically to radial turbine rotors.

BACKGROUND

Radial turbine rotors are characterized by rotating in response to a flow of working fluid radially inwardly toward the axis of rotation. In many applications, radial turbine rotors can be more efficient than axial turbine rotors that rotate in response to a flow of working fluid primarily parallel to the axis of rotation.

To increase efficiency of radial turbine rotors, it can be beneficial to increase the temperature of the working fluid that interacts with the rotors. However, manufacturing radial turbine rotors from high temperature materials and/or incorporating an active supply of cooling air into radial turbines presents challenges.

SUMMARY

The present disclosure may comprise one or more of the following features and combinations thereof in an effort to address challenges in radial turbine rotor design and manufacture.

A radial turbine rotor is disclosed in this paper. The rotor illustratively includes a metallic hub and a number of ceramic matrix composite turbine blades. The hub extends around a central axis and is shaped to define dovetail shape channels that extend primarily along the axis. The turbine blades are each shaped to include a dovetail root arranged in a corresponding one or more of the dovetail shape channels of the hub and an airfoil that extends radially-outward from the dovetail root.

In illustrative embodiments, dovetail shape channels are open along only one of a forward or an aft end of the hub. This opening allows for insertion of the turbine blades. In the exemplary embodiment, the dovetail shape channels are open along only an aft end of the hub.

In illustrative embodiments, the rotor also includes a retainer. The retainer is mounted along an aft face of the hub and the turbine blades to block undesired withdrawal of the turbine blades from the dovetail shape channels.

In illustrative embodiments, the retainer includes a retention ring and a shaft. The retention ring blocks undesired withdrawal of the turbine blades from the dovetail shape channels. The shaft is engaged with radially-inward facing surfaces of both the hub and the retention ring to couple the turbine rotor components together for rotation about the axis.

In illustrative embodiments, each of the plurality of turbine blades is further formed to include a platform. The platform extends circumferentially between airfoils of adjacent turbine blades to shield at least a portion of the hub radially inward of the platform.

These and other features of the present disclosure will become more apparent from the following description of the illustrative embodiments.

DETAILED DESCRIPTION OF THE DRAWINGS

Figure 1:
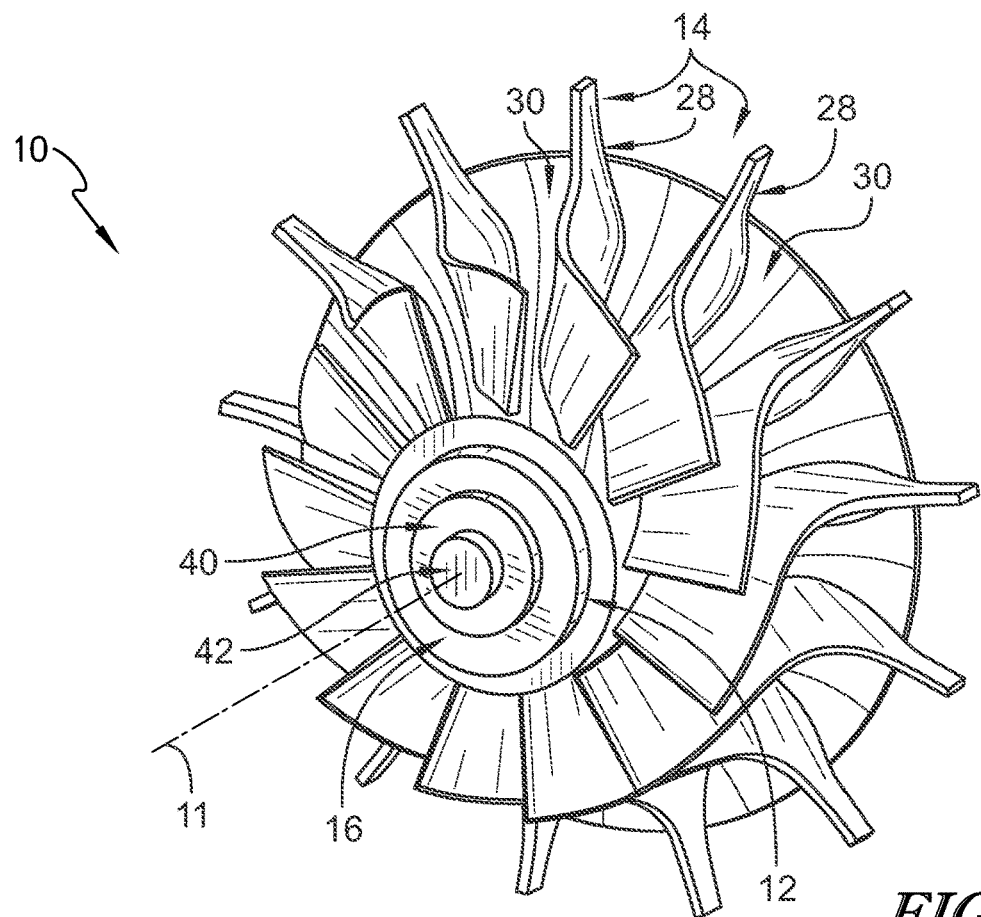
FIG. 1 is a perspective view of a radial turbine rotor assembled from a number of different pieces including turbine blades comprising ceramic matrix composite material suitable for use in high temperature applications.

For the purposes of promoting an understanding of the principles of the disclosure, reference will now be made to a number of illustrative embodiments illustrated in the drawings and specific language will be used to describe the same.

A radial turbine rotor 10 of the present disclosure is configured to extract energy from a working fluid, such as hot, high pressure combustion products, flowing through a gas path 18. The radial turbine rotor 10 rotates about a central axis 11 to extract mechanical work from the flow of working fluid to drive other components of the gas turbine engine. The flow of working fluid in the radial turbine rotor 10 may be, at least in majority part, radial to the central axis 11.

The radial turbine rotor 10 of the present disclosure is adapted for use in a gas turbine engine. The rotor 10 includes a hub 12 made of metallic materials, turbine blades 14 made of ceramic matrix composite materials (CMCs), and a retainer 16. The retainer 16 facilitates coupling of the CMC turbine blades 14 to metallic the hub 12 as shown in FIGS. 1-4.

Figure 2:
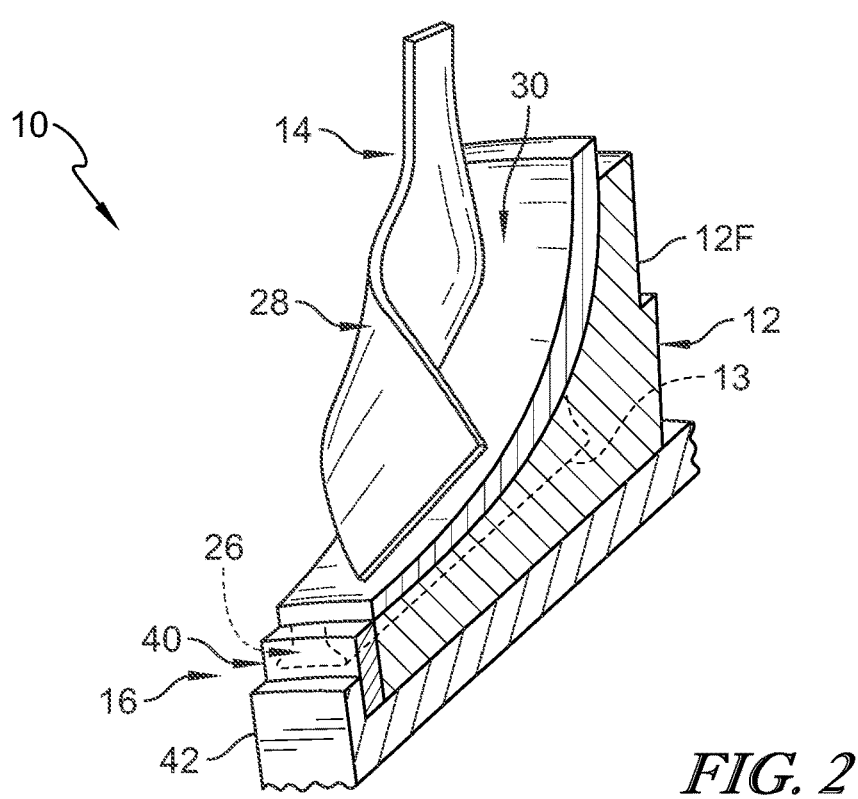
FIG. 2 is a perspective view of a cutaway portion of a radial turbine rotor showing that the rotor includes a hub formed to include a dovetail shape channels that extend primarily in an axial direction and that each of the turbine blades is shaped to form a dovetail root arranged in the dovetail shape channel.
Figure 3:
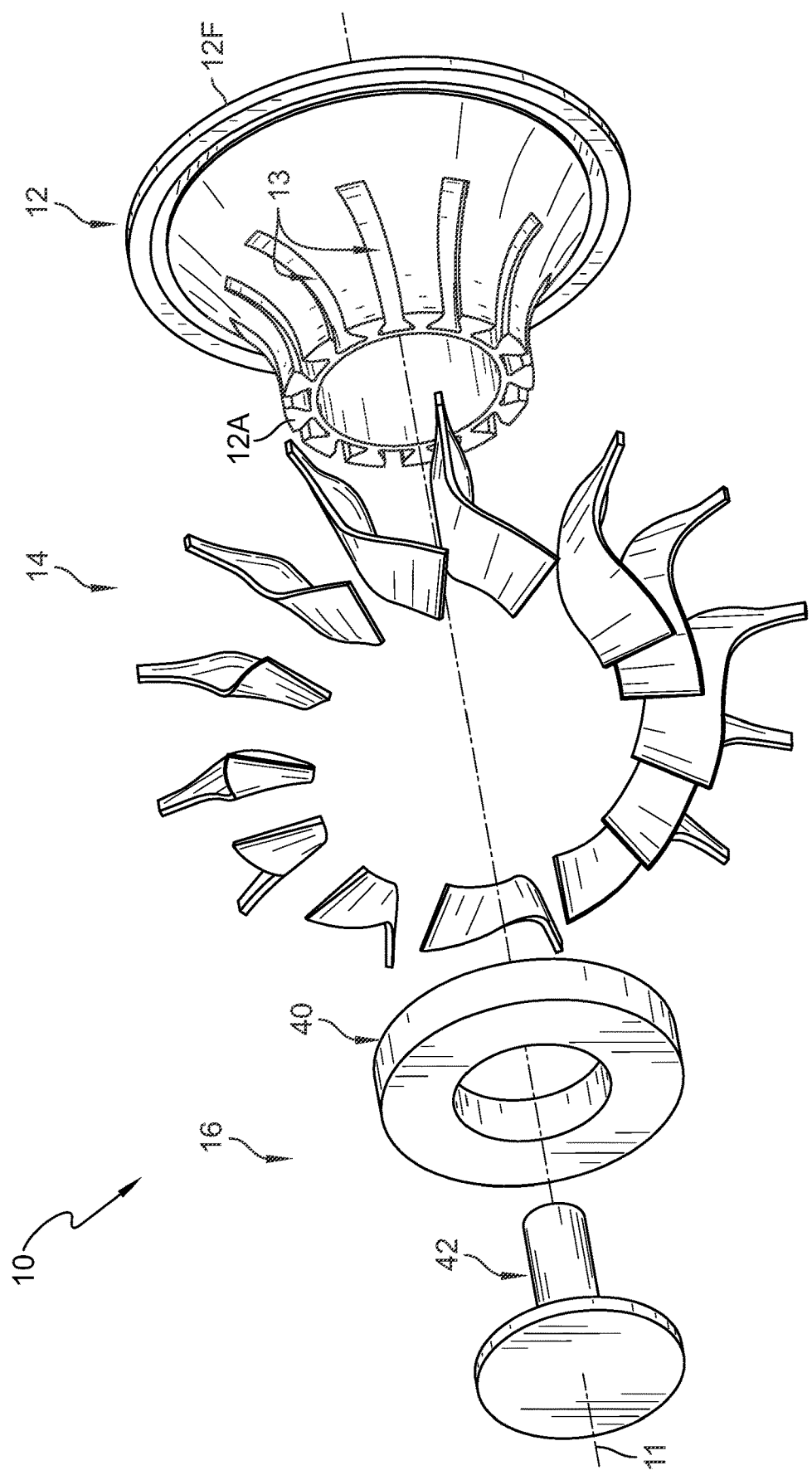
FIG. 3 is an exploded perspective assembly view of a radial turbine rotor showing that the hub is formed to include a flange with an assembly gap that extends axially into the dovetail shape channel to accommodate insertion of the roots of each turbine blade into the dovetail shape channel during assembly, and further showing that a retainer for blocking undesired withdrawal of the turbine blades from the dovetail shape channel is provided by a retention ring and a shaft.

The hub 12 is shaped to have a generally diminishing diameter from a forward end 12F to an aft end 12A as shown in FIGS. 2 and 3. The hub 12 defines dovetail shape channels 13 that extend primarily along the central axis 11. The turbine blades 14 are inserted into the channels 13 to couple the blades 14 to the hub 12 without fasteners.

In the illustrative embodiment, the dovetail channels 13 of the hub 12 are open at the aft end 12A of the hub 12 as shown in FIG. 3. This allows for insertion of the turbine blades 14 during assembly. Further, in the exemplary embodiment, the dovetail channels 13 are not open at the forward end 12F of the hub 12 such that the hub 12 blocks movement forward along the axis 11. In other embodiments contemplated, the channels 13 may be open at the forward end and/or both ends of the hub 12.

In some embodiments, the hub 12 comprises nickel superalloy, such as, but not limited to, Udimet 720. In some embodiments, the hub 12 comprises nickel powder alloy, such as, but not limited to, RR1000. In some embodiments, the hub 12 comprises polycrystalline nickel-based superalloy, such as, but not limited to, Mar-M-247. In the illustrative embodiment, the hub 12 is integrally formed (cast/forged/machined) as a single component.

The turbine blades 14 are able to withstand relatively high temperatures on account of the CMC material used to create the blades 14. In the illustrative embodiment, the blades 14 comprise silicon-carbide fibers in a silicon-carbide matrix (SiC-SiC). The turbine blades 14 are coupled to the hub 12 via a dovetail coupling.

Figure 4:
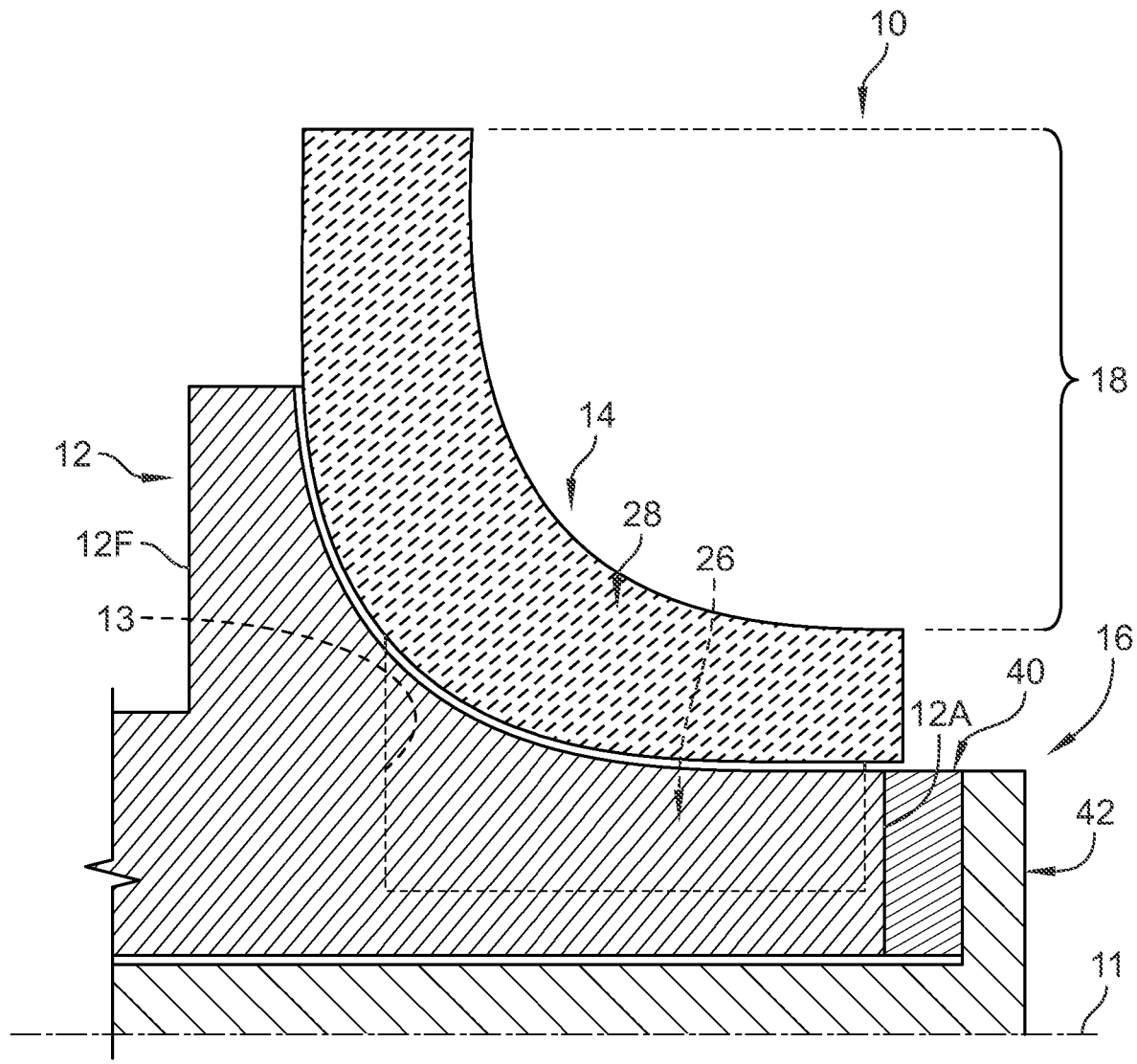
FIG. 4 is a sectional view of a radial turbine rotor showing the retention ring arranged over the assembly gap in the flange included in the hub and showing the shaft engaged with both the hub and the retention ring to couple the turbine rotor components together for rotation about the axis.

Each of the plurality of turbine blades 14 is shaped to include a dovetail root 26 and an airfoil 28 as shown in FIGS. 2-4. The root 26 is arranged in a dovetail shape channel 13 of the hub 12. The airfoil 28 extends radially-outwardly for interaction with hot gasses that flow over the radial turbine rotor 10 during use.

Each of the plurality of turbine blades 14 can be formed to include a platform 30 as shown in FIG. 1. Each of the optional platforms 30 extend circumferentially between airfoils 28 of adjacent turbine blades 14 to shield the hub 12 radially inward of the platform 30.

The retainer 16 is illustratively mounted along the aft end 12A of the hub 12 to block undesired withdrawal of the turbine blades 14 from the dovetail shape channels 13 as shown in FIG. 4. The retainer 16 includes a retention ring 40 and a shaft 42. The retention ring 40 engages the aft end 12A of the hub 12. The shaft 42 of the retainer 16 is engaged via interference fit with radially-inward facing surfaces of both the hub 12 and the retention ring 40 to couple the turbine rotor 10 components together for rotation about the axis 11.

The retention ring 40 is configured to couple the plurality of turbine blades 14 to the hub 12 as shown in FIG. 2. The retention ring 40 abuts the aft end 12A of the hub 12 and an aft face of the dovetail root 26 of each of the plurality of turbine blades 14 to block axial movement of the plurality of turbine blades 14 relative to the hub 12 as shown in FIG. 2. The shaft 42 includes a protrusion and a body extending axially away from the protrusion along the axis 11 as shown in FIGS. 2 and 3. A radial outer surface of the body engages radially-inwardly facing surfaces of each of the hub 12 and the retention ring 40 to couple the hub 12 and the retention ring 40 together for rotation about the axis 11 as shown in FIG. 2. The protrusion locates the retention ring 40 in place relative to the body of the shaft 42 and the hub 12 as shown in FIG. 2. In the illustrative embodiment, an axial face of the protrusion that faces toward the aft end 12A of the hub 12 engages an aft face of the retention ring 40 that faces away from the aft end 12A of the hub 12 as shown in FIG. 2. As shown in FIGS. 2 and 3, the protrusion of the shaft 42 has a greater diameter than the body of the shaft 42. In some embodiments, the protrusion of the shaft 42 forms a terminal end of the shaft 42 as shown in FIGS. 2 and 3. The body of the shaft 42 extends axially away from the protrusion of the shaft 42 at a center point of the protrusion as shown in FIG. 3.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A radial turbine rotor, the rotor comprising:
a hub extending around an axis and comprising metallic materials shaped to have a generally diminishing diameter from a forward end to an aft end, the hub formed to include dovetail shape channels that extend primarily in an axial direction, a plurality of turbine blades comprising ceramic matrix composite materials, each of the plurality of turbine blades shaped to include a dovetail root arranged in a corresponding one of the dovetail shape channels of the hub and an airfoil that extends radially-outward for interaction with hot gasses that flow over the radial turbine rotor during use, and a retainer including a retention ring and a shaft, the retention ring is configured to couple the plurality of turbine blades to the hub, the retention ring abuts the aft end of the hub and an aft face of the dovetail root of each of the plurality of turbine blades to block axial movement of the plurality of turbine blades relative to the hub, and the shaft is a one-piece component formed to include a protrusion and a body extending axially away from the protrusion along the axis, wherein a radial outer surface of the body engages radially-inwardly facing surfaces of each of the hub and the retention ring to couple the hub and the retention ring together for rotation about the axis and an axial face of the protrusion that faces toward the aft end of the hub engages an aft face of the retention ring that faces away from the aft end of the hub to locate the retention ring in position relative to the body of the shaft and the hub.

2. The rotor of claim 1, wherein each of the plurality of turbine blades further comprises a platform that extends circumferentially between the airfoils of adjacent turbine blades of the plurality of turbine blades to shield at least a portion of the hub radially inward of the platform.

3. The rotor of claim 1, wherein the dovetail shape channels are open along the aft end of the hub to allow for insertion of the plurality of turbine blades.

4. The rotor of claim 3, wherein the dovetail shape channels do not extend through the forward end of the hub.

5. The rotor of claim 1, wherein the body of the shaft engages the radially-inwardly facing surfaces of each of the hub and the retention ring via an interference fit.

6. The rotor of claim 1, wherein the protrusion of the shaft has a greater diameter than the body of the shaft.

7. The rotor of claim 1, wherein the protrusion of the shaft forms a terminal end of the shaft.

8. The rotor of claim 1, wherein the protrusion of the shaft is positioned axially aft of the retention ring to locate the retention ring axially between the protrusion and the hub.

9. The rotor of claim 1, wherein the body of the shaft extends axially away from the protrusion of the shaft at a center point of the protrusion.

10. A radial turbine rotor, the rotor comprising:
a hub that extends around a central axis, the hub shaped to define dovetail shape channels that extend primarily in an axial direction, a plurality of turbine blades comprising ceramic matrix composite materials, each of the plurality of turbine blades shaped to include a dovetail root arranged in a corresponding one of the dovetail shape channels of the hub and an airfoil that extends radially-outward from the dovetail root, and a retainer including a retention ring and a shaft, the retention ring abuts the hub and the dovetail root of each of the plurality of turbine blades, and the shaft is a one-piece component formed to include a protrusion and a body extending axially away from the protrusion along the central axis, wherein the body is engaged with radially-inwardly facing surfaces of each of the hub and the retention ring via an interference fit to couple the hub and the retention ring together for rotation about the central axis and the protrusion of the shaft locates the retention ring in position relative to the body of the shaft and the hub.

11. The rotor of claim 10, wherein the retention ring is mounted along an aft end of the hub to block undesired withdrawal of the plurality of turbine blades from the dovetail shape channels.

12. The rotor of claim 10, wherein each of the plurality of turbine blades further comprises a platform that extends circumferentially between the airfoils of adjacent turbine blades of the plurality of turbine blades to shield at least a portion of the hub radially inward of the platform.

13. The rotor of claim 10, wherein the dovetail shape channels are open along an aft end of the hub to allow for insertion of the plurality of turbine blades.

14. The rotor of claim 13, wherein each of the plurality of turbine blades is further formed to include a platform that extends circumferentially between the airfoils of adjacent turbine blades of the plurality of turbine blades to shield at least a portion of the hub radially inward of the platform.

15. The rotor of claim 10, wherein the retention ring abuts an aft end of the hub and an aft face of the dovetail root of each of the plurality of turbine blades to block axial movement of the plurality of turbine blades relative to the hub.

16. The rotor of claim 10, wherein the protrusion of the shaft has a greater diameter than the body of the shaft.

17. The rotor of claim 10, wherein the protrusion of the shaft forms a terminal end of the shaft.

18. The rotor of claim 10, wherein the protrusion of the shaft is positioned axially aft of the retention ring to locate the retention ring directly axially between the protrusion and the hub.

19. The rotor of claim 10, wherein the body of the shaft extends axially away from the protrusion of the shaft at a center point of the protrusion.

* * * * *